H. H. MARSHALL, Jr.
POWER TRANSMISSION DEVICE FOR AUTOMOBILES.
APPLICATION FILED NOV. 5, 1918.
1,349,428. Patented Aug. 10, 1920.
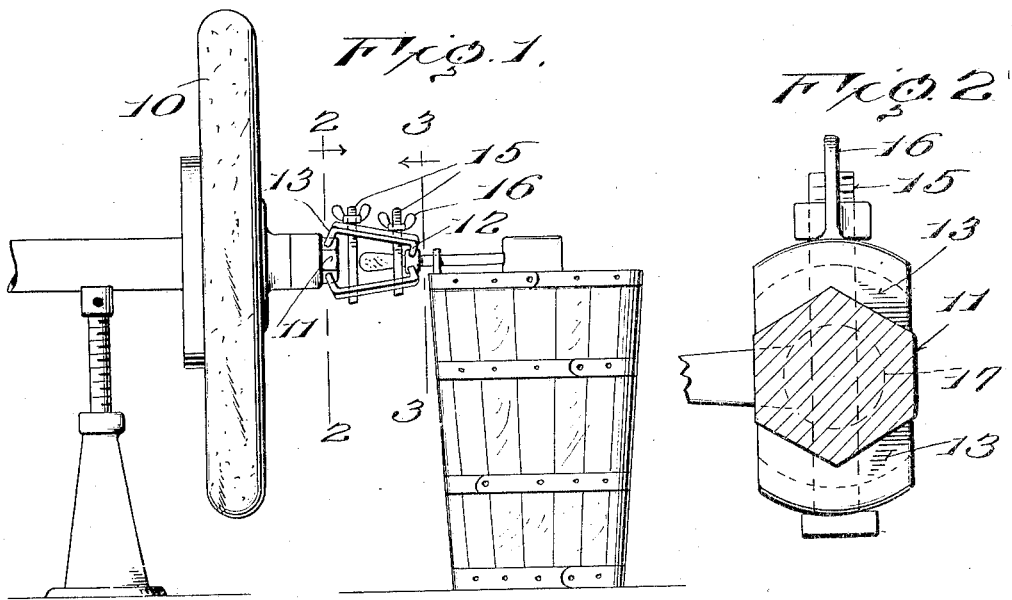
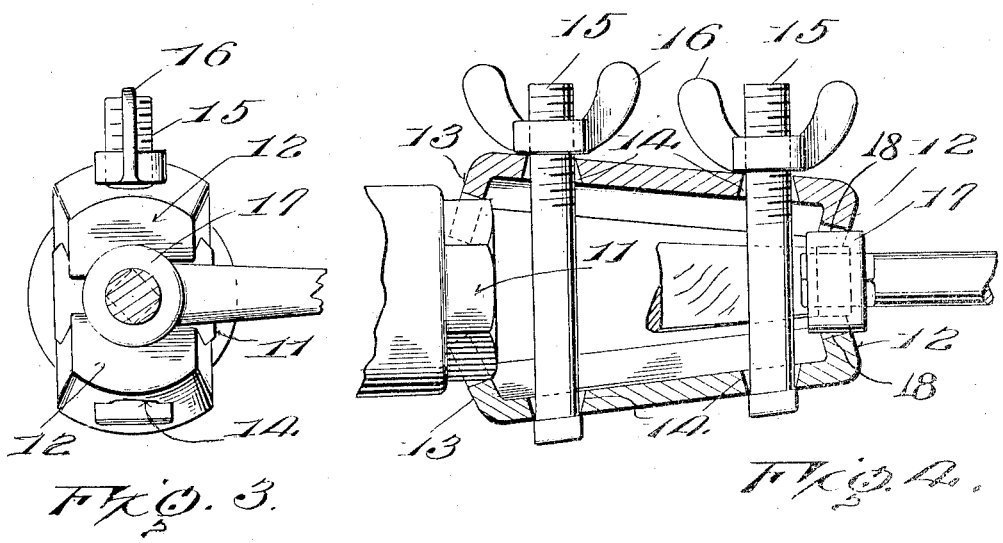
Inventor
H. H. Marshall Jr.
By Chandler & Chandler
Attorneys

UNITED STATES PATENT OFFICE.

HENRY H. MARSHALL, JR., OF GARDEN CITY, NEW YORK.

POWER-TRANSMISSION DEVICE FOR AUTOMOBILES.

1,349,428.  Specification of Letters Patent.  Patented Aug. 10, 1920.

Application filed November 5, 1918. Serial No. 261,280.

*To all whom it may concern:*

Be it known that I, HENRY HALL MARSHALL, Jr., a citizen of the United States, residing at Garden City, in the county of Nassau, Long Island, State of New York, have invented certain new and useful Improvements in Power-Transmission Devices for Automobiles; and I do hereby declare the following to be a full, clear, and exact description of the invention, such as will enable others skilled in the art to which it appertains to make and use the same.

This invention relates to new and useful improvements in power transmission devices and particularly to devices for facilitating the use of automobiles for driving external machinery.

One object of the present invention is to provide a novel and improved device of this character whereby the hind wheel of an automobile can be utilized to drive an ice-cream freezer, a washing-machine, or other machine desired.

Another object is to provide a novel and improved device which is adapted to be engaged with the hub of the wheel and with the drive shaft of the machine to cause the operation of the machine by the rotation of the said wheel under the influence of the engine of the automobile.

Other objects and advantages will be apparent from the following description when taken in connection with the accompanying drawing.

In the drawing:

Figure 1 is an elevation of an ice-cream freezer in operative connection with the rear wheel of an automobile.

Fig. 2 is an enlarged vertical sectional view taken on the line 2—2 of Fig. 1.

Fig. 3 is an enlarged vertical sectional view taken on the line 3—3 of Fig. 1.

Fig. 4 is an enlarged vertical longitudinal sectional view taken through the hub and attachment, together with the crank and shaft of the ice-cream freezer.

Referring particularly to the accompanying drawing, 10 represents the rear wheel of the automobile, and 11 the hub cap thereof, and in connection with which my invention is used. The hub cap, as a general rule, is formed with wrench engageable faces. The attachment includes a pair of members each of which has its ends turned downwardly as shown at 12 and 13, the former ends being bent at obtuse angles while the latter ends are bent at acute angles, to the bodies of the members. Both of these members are arcuate in cross section, and are longitudinally tapered, as clearly shown in Fig. 4. Through each end of each of the said members are formed openings 14, for the reception of the clamping bolts 15, the heads bearing on the lower face of the lower member, while a winged nut 16 bears on the upper face of the upper member. These members are placed in gripping engagement with the hub of the automobile wheel, and with the crank shaft 17 of the ice-cream freezer, as clearly shown in Fig. 1.

As seen in Figs. 2 and 3, the ends of the members which grip the hub and crank shaft, each has one side portion slightly longer than the other, the hub portions being cut out at obtuse angles to fit the wrench engaging faces of the hub cap, thus causing the attachment to rotate with the wheel. The shorter portions of the ends of the members are adapted to engage on each side of the crank of the shaft of the ice-cream freezer, while the longer portions engage the shaft at the other side of the crank, whereby when the automobile is rotated the crank shaft will be turned to produce the proper operation of the freezer. As clearly seen in Fig. 4, the ends of the gripping members are grooved, and especially the ends which engage with the freezer shaft, as indicated at 18, whereby a firm grip on the shaft and crank is obtained, and the danger of displacement is obviated.

It will, of course, be understood that the rear wheel of the automobile is jacked up from the ground or floor so that when the engine is started the wheel will turn the freezer shaft, and the ice-cream be frozen in a very short time.

It will, of course, be further understood that the device can be as effectively used to couple the wheel hub of the automobile with the crank shaft of a washing machine, or other machine desired. Thus there is provided a novel and simple, as well as cheap device which is capable of use with any automobile, and whereby the automobile may be utilized to drive machines without the use of gears, pulleys, and belts, which are commonly provided when the automobile is made use of in this manner. No modifications to the automobile or to the machine to be driven, being necessary to the successful operation of the invention.

What is claimed is:

1. A coupling for the purpose specified comprising a pair of spaced members each having clamping jaws at its ends directed toward and in coöperative relation to the jaws of the other member, and separate means connecting the corresponding ends of the members for moving each pair of corresponding jaws independently of the other pair.

2. A coupling for the purpose specified comprising a pair of spaced members each having clamping jaws at its ends directed toward and in coöperative relation to the jaws of the other member, each member having enlarged perforations in its end portions, and bolts disposed through corresponding perforations for drawing the corresponding pairs of jaws toward each other independently of the jaws at the other ends of the members.

3. A transmission for coupling the drive wheel of an automobile to the shaft of a machine to be driven and which has a crank thereon, including a pair of elongated members each having its opposite ends turned for gripping engagement with the hub cap of the wheel and with the shaft of the machine, the crank engaging portions being formed with one end shorter than the other for permitting the passage of the crank therebetween and for firm gripping engagement with the crank, and clamping bolts disposed through said elongated members.

4. A transmission device, which is adapted to be engaged with the hub of the wheel and with the drive shaft of the external machine to be driven, to cause the operation of the said machine by the rotation of the drive wheel under the influence of the engine of the automobile.

5. A transmission coupling for coupling the drive wheel of an automobile and the drive shaft of a machine, one end portion of which is shaped to engage the drive wheel of the automobile, the other end portion being designed to engage the crank shaft of the external machine to be driven.

6. A transmission device comprising a coupling having gripping means for simultaneously gripping the drive wheel of an automobile and the shaft of a machine.

7. A transmission coupling for coupling the drive wheel of an automobile and the crank handle of the driving shaft of a machine, one end portion of which is shaped to engage the hub cap of the drive wheel of an automobile, the other end portion being shaped to engage the crank handle and adjacent portion of the drive shaft of the machine.

8. A transmission coupling for directly and positively coupling the drive wheel of an automobile with the drive shaft of a machine comprising a pair of detachable and adjustable gripping elements.

In testimony whereof, I affix my signature, in the presence of two witnesses.

HENRY H. MARSHALL, Jr

Witnesses:
WILLIAM LEYSER,
BIRDSALL E. GILBERT.